April 20, 1926.

C. H. STOEBER 1,581,243

HUMIDIFIER ATTACHMENT FOR HOT AIR REGISTERS

Filed May 18, 1925

Inventor
C. H. Stoeber,
By Clarence A. O'Brien
Attorney

Patented Apr. 20, 1926.

1,581,243

UNITED STATES PATENT OFFICE.

CHARLES H. STOEBER, OF ROCHESTER, NEW YORK.

HUMIDIFIER ATTACHMENT FOR HOT-AIR REGISTERS.

Application filed May 18, 1925. Serial No. 31,009.

*To all whom it may concern:*

Be it known that I, CHARLES H. STOEBER, a citizen of the United States, residing at Rochester, in the county of Monroe and State of New York, have invented certain new and useful Improvements in a Humidifier Attachment for Hot-Air Registers, of which the following is a specification.

This invention relates to an attachment for hot air registers and has for its principal object to provide a humidifier in connection with a hot air register whereby the air which enters a room from the register will be moistened.

A further object of the invention is to provide an attachment of the above mentioned character, wherein means is provided for directing the heated air from the register into a room in such a manner as to prevent the hot air from traveling upwardly along the wall of the room, insuring the proper distribution of the heat in a room.

A further object of the invention is to provide an attachment of the above mentioned character wherein the heat distributing means also provides a means for indicating the amount of heat entering a room through a hot air register.

A still further object is to provide an attachment of the above mentioned character which may be readily and easily associated with a hot air register, the same being further simple in construction, inexpensive, strong and durable and further well adapted to the purpose for which it is designed.

Other objects and advantages of this invention will become apparent during the course of the following description.

In the drawing, wherein for the purpose of illustration I have shown the preferred embodiment of my invention, like numerals designate like parts throughout the same:

Figure 1:
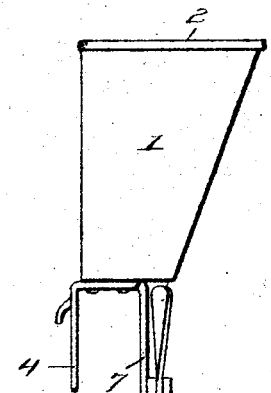
Figure 1 is a side elevation of the attachment embodying my invention.
Figure 2:
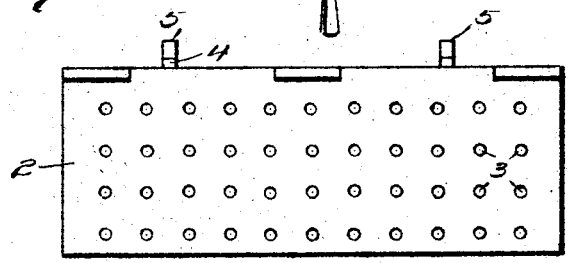
Figure 2 is a top plan view.
Figure 3:
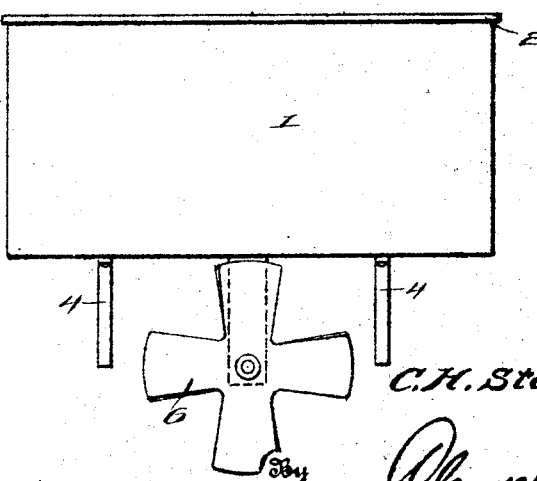
Figure 3 is a front elevation.

In the drawing, wherein for the purpose of illustration is shown the preferred embodiment of my invention, the numeral 1 designates a water pan or receptacle, the same being provided with a hinged cover 2. The cover is provided with a series of perforations such as is illustrated at 3 whereby moisture may escape from the water contained in the water pan or receptacle when heated by the action of heated air passing into a room from a hot air register, not shown.

The humidifier is adapted to be movably supported adjacent the wall of a room directly above the register by means of the bracket 4. These brackets are provided with hooks 5 which engage the grating of the hot air register whereby the attachment is rigidly supported in position with respect to the hot air register.

A fan designated generally by the numeral 6 and of any well known construction is supported below the water pan or receptacle 1 on a suitable bracket 7 which depends from the intermediate portion of the bottom of the receptacle or pan. The purpose of this fan will be presently described.

The pan or receptacle is filled with water and when the attachment is in position over a hot air register in a room, it is obvious that the heat entering the room through the hot air register will heat the water in the pan causing the moisture to escape out through the openings 3, thus humidifying the hot air which enters through the hot air register. The fan 6 will be caused to be rotated by the action of the hot air entering the room from the hot air register, thus causing the humidified air to be circulated instead of the hot air traveling along the walls of the room as is the case when a fan is not used. Furthermore, the provision of the fan 6 forms an indicator whereby a person may readily ascertain the amount of heat entering the room through a hot air register without having to place his hand against the register as is now frequently done. The rate of speed at which the fan will rotate will depend upon the amount of heat entering the room through the register and as the fan is located directly in front of the register, the same will at all times properly function.

It will thus be seen from the foregoing description, that a humidifier has been provided which will at all times be positive and efficient in carrying out the purpose for which it is designed and may be readily and easily installed without necessitating any alteration of the hot air register or the wall of a room. When the water in the pan has evaporated, the same may be easily refilled by swinging the hinged cover upwardly.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

An attachment for hot air registers comprising a humidifier, and means for detachably supporting the same above a hot air register, a fan supported below the humidifier and adapted to be disposed in front of the hot air register for directing the heated air outwardly, said fan further providing an indicator whereby the amount of heated air entering a room from the hot air register may be ascertained.

In testimony whereof I affix my signature.

CHARLES H. STOEBER.